United States Patent [19]

Kelly et al.

[11] Patent Number: 5,173,853
[45] Date of Patent: Dec. 22, 1992

[54] DATA FORMAT CONVERSION

[75] Inventors: Jean Kelly, Knocknacarra; Paul McNelis, Shannon; J. Mark Smith, Knocknacarra, all of Ireland

[73] Assignee: Digital Equipment International Ltd., Switzerland

[21] Appl. No.: 669,173

[22] Filed: Mar. 14, 1991

[30] Foreign Application Priority Data

Mar. 14, 1990 [GB] United Kingdom ............... 9005697

[51] Int. Cl.⁵ ............................................. G06F 15/38
[52] U.S. Cl. .................................... 364/419; 395/148
[58] Field of Search ............... 364/419; 395/144, 145, 395/146, 147, 148

[56] References Cited

U.S. PATENT DOCUMENTS

4,723,209  2/1988  Hernandez et al. ............... 364/300
4,723,211  2/1988  Barker et al. ........................ 395/148

Primary Examiner—Roy N. Envall, Jr.
Assistant Examiner—Ari Bai
Attorney, Agent, or Firm—Ronald E. Myrick; Barry N. Young

[57] ABSTRACT

A style of document format known as compound document architecture is known, in which a document is broken up into a tree of objects or segments (e.g. document: chapter: subtitle: para: para: etc.), possible with a second layout tree. Two styles of such architecture are ODA and CDA. Conversion from CDA to ODA presents difficulties, as in CDA, a segment can contain e.g. text and graphic elements, while ODA has stricter formatting rules. One of a plurality of DAPs (Document Application Profiles) 12 is selected, depending on which subset of full ODA is being used. The DAP contains a structure converter component which starts to construct the objects of the ODA document. When an information element is reached (text, graphics, etc.), it is sent to the appropriate one of a set of content handlers 13. These call back to callback units (text, graphics, footnote, etc.) in the DAP when an ODA logical object is to be completed, and on each other (possible recursively, as for footnotes in text) when a change of information element type is reached.

14 Claims, 6 Drawing Sheets

FIG. 1
ODA

FIG. 2
CDA

DATA FORMAT CONVERSION

BACKGROUND OF THE INVENTION

1. Field of the Invention

The present invention relates to the conversion of data between different formats, and more particularly to such conversion between different forms of compound document architecture.

2. Data Architectures—General

In word processing, desk-top publishing, and the like, a variety of data formats have been developed. The simplest formats are designed to deal only with textual matter. Even with such an apparently simple situation, there are many aspects which may or may not be dealt with, and which, if they are dealt with, may be dealt with in a variety of ways. These include, for example, word wrapping, right justification, headers and footers, and margin control. More advanced formats include provision for things like footnotes and paragraph and section numbering, tabular information, geometric graphics, and bit image graphics.

As the nature of such formats becomes increasingly complex, it becomes convenient to distinguish between the general principles or rules of a format and the details of the implementation of such a set of principles. The set of principles is commonly termed an architecture, and an implementation is often termed an interchange format of that architecture.

With a simple architecture, such as that provided by a basic word processing system, the structural features of a document formatted under that architecture are very simple. With such an architecture, the document will normally be formatted as a stream of alphanumeric characters—the text—with whatever structural features it has being embedded within that stream. That is, features such as line returns will be represented by control codes occurring at the appropriate points within the character stream. Similarly, such matters as the starting and stopping of italics and bold-face can be represented by the inclusion of control characters in the character stream. This style of architecture can obviously be extended to more complicated situations. For example, if the architecture includes pagination, the codes for page endings can obviously be included in the character stream.

The appropriate information regarding such matters as line and page length must obviously be specified. In very simple cases, this can sometimes be dealt with by the operation of whatever printer the document is sent to. However, it is more usual for such information to be included within the document. If the line and page lengths are unchanged throughout the document, then this information will normally be included at the beginning of the document, preceding the text, and forming a header block.

This technique naturally extends to the provision of similar control blocks at appropriate points within the information stream where the format (in the sense of such matters as margins and page length) of the document changes. A simple example is the inclusion of a quotation in the form of a distinct paragraph using a smaller typeface than and with its margins inset from the main text. This will be preceded by a control block setting the typeface and margins, and will naturally be followed by another control block setting the original typeface and margins.

The discussion so far has largely assumed that the document is fully formatted. However, it is often convenient to separate the informational contents of the document from its final formatting. The document in its initial state is in what is termed processable form. (The term "informational contents" is to be taken in the broad sense of including the general parameters of the document such as page headers and footers, typeface, paragraph insets, narrowed margins, etc. are defined.)

With a processable document, the details of the actual page layout (primarily page width or line length and page length) are left undefined. When the document is finally printed as a hard copy, the printing system has to have such formatting information supplied to it, and the system has to calculate the positions of line and page endings and make appropriate adjustments (e.g. in page numbering and footnote positioning).

A major advantage of using documents in processable form is that editing of the document is simplified, for two reasons. One is that the editing of the document (usually on a word processor) does not have to take account of the details of the layout of the document on the page. This means that the operation of the word processor is faster, particularly in situations where the operator jumps between widely separated locations in the document. (If the document is maintained in fully formatted form, the system would have to reformat the whole of the text between the relevant locations in moving forward from one to the other).

The other reason is that the document can be transferred between different systems much more easily. Such different systems may involve different hardware, or something apparently as minor as a slight change of printer character style (which will require recalculation of line lengths), or perhaps simply a change in the size of paper. Again, if the document were fully formatted, such a change would involve reformatting the whole document, whereas with the document in processable form, no change is required to the document.

It will be assumed from here on that documents are in processable form.

Compound Document Architecture—General

The formatting technique discussed above consists essentially of incorporating the formatting information in the character stream of the document. With a very simple word processing system, such information may consist for example of little more than paragraphing, and this technique is generally satisfactory. However, in more complicated situations, this technique can become unwieldy.

A simple example can arise in the situation mentioned above, where there are quotations in the text. If there are several such quotations, there will be a corresponding number of repetitions of the control blocks. Another situation is where the document is large, consisting of a number of chapters each subdivided into sections.

Further, there is often a need for systems which are more elaborate that simple word processing systems. The possibilities of such things as typeface changes have already been mentioned, and such systems can be developed further to permit the inclusion of, for example, geometric and/or raster graphics and various kinds of lists and tables.

For these and other reasons, an alternative approach has been developed as the architecture becomes more complicated, giving a second style of architecture, generically termed compound document architecture.

This second style involves the separation of the structure of a document from its contents.

With this approach, the logical structure of a document is defined in the form of a tree, which can most easily be explained by means of an example. Suppose the document is a textbook. Then the first level of structure of the document may be defined as consisting of a title, a list of contents, an introduction, a number of chapters, a list of references, and an index, with the number of chapters being variable and, say, the presence of an introduction being optional. In turn, each of these elements has its own structure; for example, the structure of a chapter may consist of a title and a number of sections each with a section heading. An element with such a structure of its own is termed a compound element; an element with no such subordinate structure is termed a basic element.

With this second, more formalized and structured, architectural style, the format or layout of the document is a separate and to some extent subsidiary matter which has to be superimposed on the logical structure. This is done by defining a layout structure for each logical element. In principle, this could be achieved by defining a set of independent layout structures, but since the desired layouts of the various logical elements will usually have many features in common, this is achieved in practice by defining a tree of layout elements.

The logical structure will thus consist of a tree of elements, with the final or "leaf" elements containing the actual data (text or other information). The "leaf" elements of the layout structure or tree will be associated with the "leaf" elements of the logical structure. Minor local features of the layout, such as boldface and italics, are embedded in the character string of the logical element by the layout process.

As with the first architectural style, the compound document style can be tailored to produce either a processable or a fully formatted document. There is a further complication with the fully formatted form, since the logical elements as so far described are independent of page breaks. What is usually done is that logical element crossing a page break is redefined as two separate logical elements, one on each page. (These two logical elements naturally share a common logical parent.) We shall here, however, assume as before that we are concerned primarily with documents in processable form.

A different issue has to be addressed if complicated information is to be dealt with. Information may, as assumed so far, be in the form of text; however, it may also be desirable to deal with information in other forms, such as geometric graphics, raster (bit image) graphics, tables, spreadsheets, and so on. (Geometrical graphics are diagrams defined in terms of lines whose end-point coordinates are given, circles whose center coordinates and radii are given, fill patterns, etc; bit image graphics are diagrams defined by the states of their individual pixels.) These will in general need their own formats to be defined largely independently of the formats of other types of information, and these formats will be included as control blocks or layout elements depending on the architectural style.

In general, blocks of information of different types may follow each other and/or be embedded in each other fairly freely in the first architectural style. In the second style, a basic logical element must be of a single information type, but a compound logical element can include basic logical elements of different information types.

A special situation arises with footnotes, which have to be treated to some extent as if they are of a different information type although they are usually text occurring in text. With the second architectural style, a footnote is dealt with by means of a separate logical element. (With the first style, a footnote is embedded in the character stream by means of a suitable control clock.)

There is of course a vast variety of specific data formats, and there is often a need to convert data from one format to another. Such conversion can rarely be performed perfectly even if the two formats use the same architectural style. The present invention is concerned with the conversion between certain different implementations or architectures of the second style.

CDA and ODA Compound Document Architectures

Several compound document architectures currently exist, e.g. CDA and ODA (note that the word "compound" is used in two different senses, one generic and the other specific (CDA)). Each of these defines how compound documents can be represented and stored. More specifically, CDA is Compound Document Architecture and ODA is Open Document Architecture. These have associated with them two respective specific formats, DDIF (Digital Document Interchange Format) and ODIF (Office Document Interchange Format) respectively. The ODA/ODIF architecture and format are defined by ISO document ISO 8613, and the DDIF architecture and format are defined by document DEC STD 078 of Digital Equipment Corporation. CDA and ODA are architectures, and DDIF and ODIF are particular formats which conform with those respective architectures.

Both these architectures and their associated formats are widely used, and there is an obvious need to be able to convert data in either format into the other. However, these two architectures and formats differ significantly. The conversion between them is therefore not trivial.

The present invention will be described with reference to CDA/DDIF and ODA/ODIF. It should however be understood that it is not limited to any particular features of those particular architectures, and also that many of the characteristics of those architectures are described in modified and/or simplified form for present purposes.

The details of the structures of documents in ODA/ODIF and CDA/DDIF are defined by the documents noted above. However, to understand the present invention, a brief informal description of these structures is desirable.

Both structures utilize a hierarchy of elements (generally termed "objects" in ODA/ODIF and "segments" in CDA/DDIF) arranged in tree form, the tree starting with a root element. For example, if the document is a book, the root element will be the entire document (the book); the elements in the first level down will be the chapters; the elements in each chapter may be a title and a number of sections; the elements in a section may be a section heading a number of paragraphs; and so on. Each element will in general have a number of attributes, each of which can have one of a range of possible values.

In ODA/ODIF, the elements just mentioned form the logical structure. The root element is termed a root logical object. At the "leaf" ends of the branches, the lowermost elements are termed "contents portions"; these contain the content or material of the document. The elements between the root element and the content portion elements are termed "basic logical objects" (BLOs) if they contain only contents portions, or "compound logical objects" (CLOs) otherwise (i.e. if they contain further logical objects).

In ODA/ODIF, the layout of a document is described by a layout structure which is also in the form of a tree. The layout structure has a root element, the document. The elements one level down are page sets; the elements the next level down are pages; these may be followed by frames (optionally several levels thereof); and these by blocks (forming the lowest level). This layout tree is independent of the logical structure, though it will usually have some general similarities with that logical structure. For example, if the document is a book, then the logical structure of a chapter element being composed of a heading element and section elements will usually be reflected in a layout structure of a heading layout element and a section layout element, but most or all of the logical section elements will share a single common section layout element.

In ODA/ODIF, these two trees for a document must be constructed in such a way that each content portion of the logical structure is paired with a corresponding block in the layout structure. As noted above, this will often involve splitting a paragraph between two columns or pages.

It will be realized that when a document is being worked on (created or edited), the full constraints are not normally observed. This is because, as is well recognized, the editing of a document is slowed and complicated considerably if the document is reformatted very time a small change is made to its contents. Instead, the full constraints are imposed on the document when editing ends. (This principle applies equally to ODA/ODIF and CDA/DDIF.)

In CDA/DDIF, there are logical and layout tree structures somewhat similar to those of ODA/ODIF. However, the structure of CDA/DDIF is less rigidly constrained and defined than that of ODA/ODIF, which is more rigidly formalized and structured.

To some extent, CDA/DDIF uses an implicit galley-based layout (though the attributes of the various elements will generally define many of the characteristics or features of the layout—for example, fonts, font sizes, line widths, &c). CDA/DDIF is thus simpler than ODA/ODIF in some ways; however, it is more elaborate in others (for example, it allows the use of live links and external references).

To a considerable extent, individual elements in ODA/ODIF and CDA/DDIF correspond directly to each other on a one-to-one basis. Among these elements may be, for example, elements, attribute names, attribute values, text strings, and so on.

However, the differences between these two architectures means that this correspondence is not exact. Thus CDA/DDIF allows what is in effect a nesting of segments, which results in the segmentation being somewhat less clear-cut than in ODA/ODIF. Further, in this nesting in CDA/DDIF, a contents portion of one type (e.g. textual) can be followed by a contents portion of another type (e.g. graphical), whereas in ODA/ODIF, contents portions of different types must be in distinct (logical) objects. (The different types of contents—e.g. text, raster graphics, and geometric graphics—may also be termed metaclasses.)

In addition to the obviously different types of contents (text, geometric graphics, raster graphics, list structures, and so on), there is another situation in which different pieces of contents need to be treated to some extent as different types, even though they are both textual. This situation is that of footnotes. In CDA/DDIF, a footnote can be included (embedded) in the middle of a textual segment. In ODA/ODIF, a footnote has to have its own object (or, in fact, its own object tree, as will be described later). Somewhat similar situations arise with things such as the insertion of page numbers in the form of cross references in the body of the document (as distinct from page numbers in headers or footers, which are not involved in documents in processable form).

For the operation of the system to be explained, it is desirable to outline the nature of ODA/ODIF and CDA/DDIF in rather more detail.

ODA Document Structure

Considering first ODA/ODIF, an ODIF document is structured as a pair of trees, a logical tree for the contents and a layout tree. The logical tree ends in blocks which correspond one-to-one with "contents" objects (basic logical objects, BLOs) and which are the actual contents of the BLOs. The two trees meet at the "leaf" level, with each BLO (or block) of the logical tree being also a final or "leaf" element of the layout tree. A single "contents" object can contain contents of only one type—text, geometric graphics, bit image graphics, etc. (Hence a diagram will typically be defined by a "diagram" object as consisting of a geometric graphics object, a title, and optionally one or more labels to go in the diagram.)

The objects of the logical tree, as discussed above, define the logical structure of the document, and each object constrains the number, type, and arrangement of the objects connected directly below it. The layout objects define the layout of the document, and each may contain attributes. Attributes are inherited by default; thus if a object does not declare values for some attributes, those attributes have the values declared in the object above it in the tree. Logical objects may also contain attributes, which over-ride the attributes of the layout objects which would otherwise apply. Each final layout object defines the layout and presentation of the contents of the logical objects coupled to it.

Figure 1:
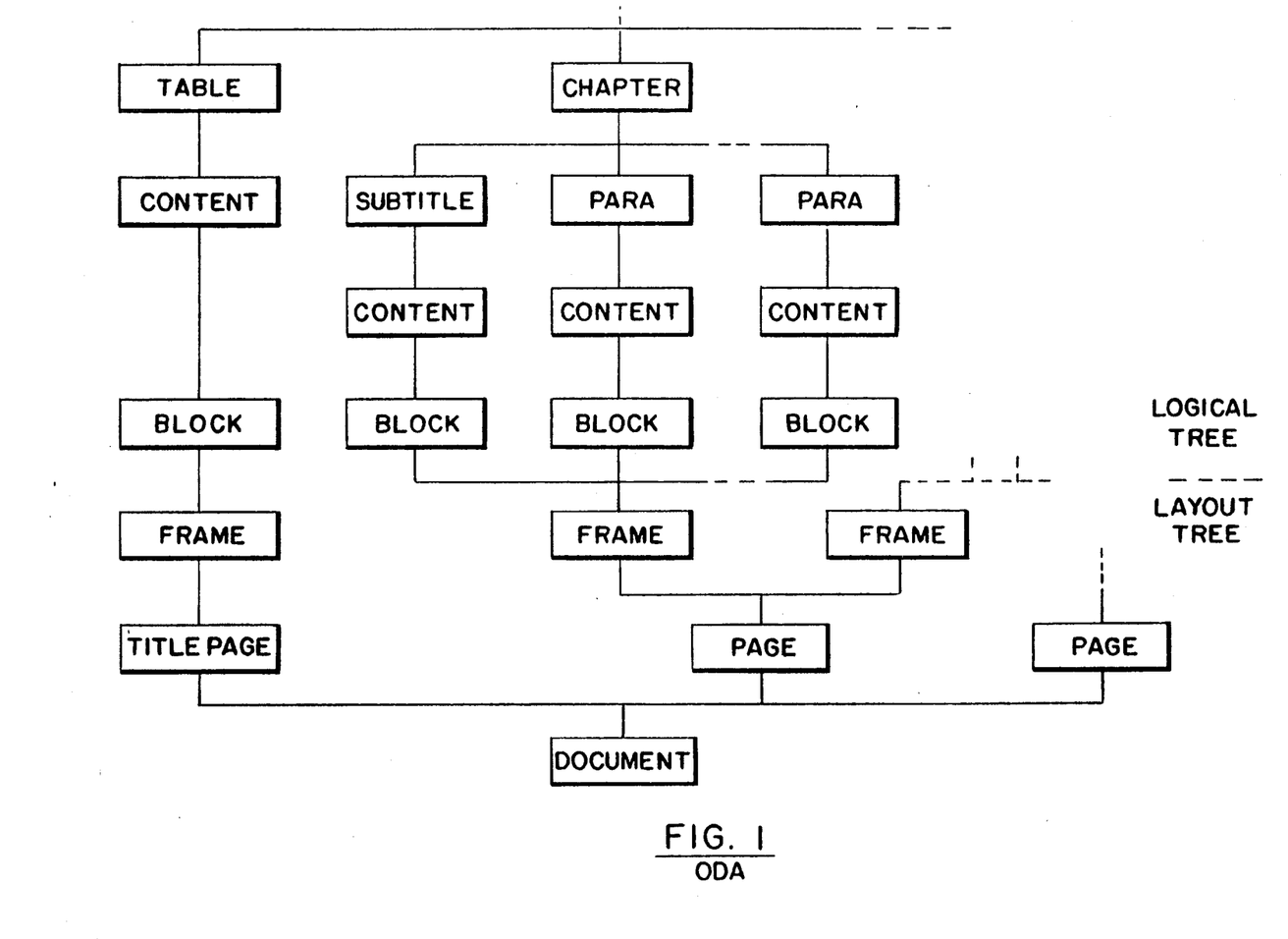
FIGS. 1 and 2 are block diagrams illustrating the general structure of an ODA document and a CDA document respectively.

The general structure of an ODIF can thus be shown as a double tree, FIG. 1 being a simplified example. The same document can alternatively be represented in tabular form, as shown in Table I. This is broadly the form in which the document is stored in memory. The tabular structure of the document in this form is present in a relatively explicit manner.

TABLE I

Logical object 1
"Chapter"
Listing of permitted sub-objects
Logical object 1.1
"Table"
Listing of permitted sub-objects
Logical object 1.2
"Section"
Listing of permitted sub-objects
•••
Logical object 1.1.1
"Content"
Logical object 1.2.1
"Subtitle"
Listing of permitted sub-objects

TABLE I-continued

```
Logical object 1.2.2
"Section"
    Listing of permitted sub-objects
Logical object 1.2.3
"Section"
    Listing of permitted sub-objects
***
Logical object 1.2.1
"Content"
    Block 1.2.1
    Layout - layout object 1.1.1
Logical object 1.2.1.1
"Content"
    Block 1.2.1.1
    Layout - layout object 1.1.2
Logical object 1.2.1.2
"Content"
    Block 1.2.1.2
    Layout - layout object 1.1.2
***
Layout object 1
"Document"
    Attributes
    Listing of permitted sub-objects
Layout object 1.1
"Title page"
    Attributes
    Listing of permitted sub-objects
Layout object 1.2
"Page"
    Attributes
    Listing of permitted sub-objects
***
Layout object 1.1.1
"Title page frame"
    Attributes
Layout object 1.1.2
"Frame"
    Attributes
***
```

CDA Document Structure

Considering now CDA/DDIF, a DDIF document is also generally structured as two trees of segments, a logical (or "contents") tree and a layout tree. As with ODA/ODIF, the logical segments may contain layout or formatting information or attributes as well as contents, and it is sufficient for present purposes to consider primarily the logical segments. Each segment may contain attributes, and also primitive contents elements. If a segment contains primitive contents elements—that is, informational contents—then it also includes an indication of the type of the contents—that is, whether the contents are text, geometric graphics, bit image graphics, etc.

Figure 2:
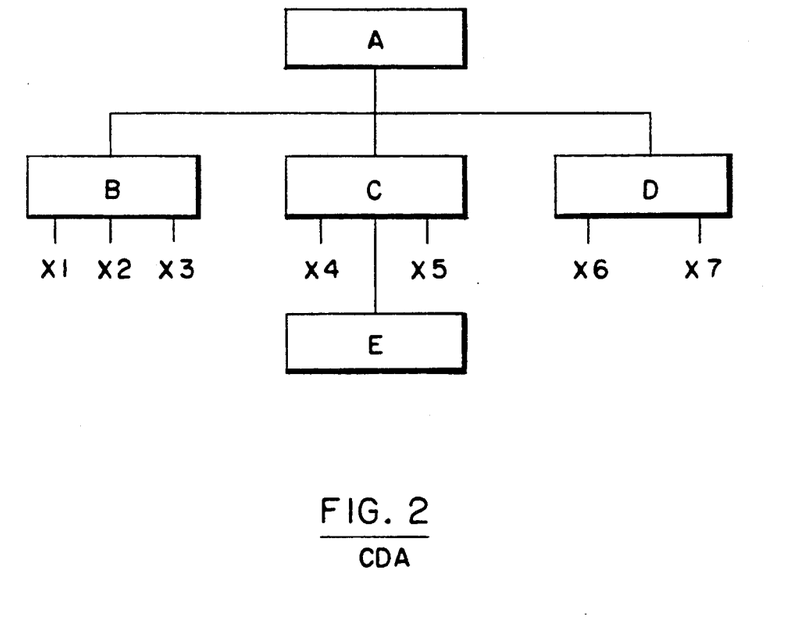

The general structure of a DDIF document can thus be shown as a tree, FIG. 2 being a simplified example. The same document can alternatively be represented in tabular form, as shown in Table II. This is broadly the form in which the document is stored in memory. (The indentations are of course provided only to clarify its logical structure.) The tree structure is present only in implicit form.

TABLE II

```
[
Segment A
attributes
    [
    Segment B
    attributes
        [
                primitive contents element × 1
        ]
        [
                primitive contents element × 2
        ]
        [
                primitive contents element × 3
        ]
    ]
    [
    Segment C
    attributes
        [
                primitive contents element × 4
        ]
        [
        Segment E
        computed contents
        ]
        [
                primitive contents element × 5
        ]
    ]
    [
    Segment D
    attributes
        [
                primitive contents
                element × 6
        ]
        [
                primitive contents
                element × 7
        ]
    ]
]
```

It will be realized, of course, that there are many features of ODA/ODIF and CDA/DDIF which are not described here. For example, a document also has a document description (which identifies the version of DDIF being used and the software which created the document), and a document header (which contains, e.g. title, author, version number, data, etc). The document content may also include further features, such as the "computed contents" segment E of FIG. 2, which provides contents which are copied from some outside source (elsewhere in the document, or from some other document). A reference in the text to the page number of another part of the document is one example of this, and the numbering of footnotes is another.

It will be realized that when a document is in ODIF or DDIF form, it is in the form of a stream of data (some of which is control data.) Although the full tree structures, for example, are of course present, these tree structures are implicit and can only be recovered from the stream of data by suitable processing. Mechanisms termed toolkits have been developed, for both ODA/ODIF and CDA/DDIF, which can analyze a document in ODIF or DDIF form to allow it to be manipulated much more readily then would be required if the string itself had to be analyzed for each operation. Such a toolkit can manipulate the attributes of a document, but cannot manipulate the document itself (its "contents").

It will be realized, of course, that the conversion of a document from one format to another will normally result in a loss of finer details of the arrangement of the document. For example, the precise fonts and range of character sizes may be different in the two systems. A more extreme example is if the source document contains a graphic element (a drawing or diagram) with associated text elements (labels for parts of the drawing). The conversion is most unlikely to be able to automatically locate the converted text elements in the correct positions in the converted graphic element; and rather than attempt that task, the conversion will normally merely convert the text elements into a simple list above or below the graphic element. Such loss of fine details is normally tolerable; it is however generally regarded as essential that no information content (as opposed to its form of presentation) should be lost in the conversion.

The general object of the invention is to provide an improved means of converting documents in a CDA-like form into an ODA-like form.

SUMMARY OF THE INVENTION

According to one aspect, the present invention provides a data structure format conversion system comprising a plurality of profile conversion components for converting the logical and/or layout structures of the source document to those of the target format; a plurality of content architecture conversion components selected by the profile conversion components for converting the contents of the source document to the target format and being invoked by the required content architecture conversion component; and a main converter component for identifying the profile to which the compound document conforms and invoking the required profile conversion component.

This aspect of the present conversion system thus provides for the conversion of compound documents where a well-defined subset of the entire compound document architecture is used to represent a particular set of compound documents. In this case, the subset of the entire compound document architecture is termed a "profile". A profile therefore identifies what parts of the entire compound document architecture are allowed to be used to represent this subset of documents. It identifies the attributes (and their values) that may be defined within compound documents which conform to the profile. It may also define constraints on the complexity of the logical and/or layout structures defined by those compound documents.

This architecture allows the system to be designed so that further profile and/or content architecture conversion components can readily be added without requiring modification of the existing components of the system.

According to another aspect, the present invention provides a data structure format conversion system comprising a structure architecture conversion component for generating logical objects of the target document architecture, comprising a structure converter unit for generating compound logical objects of the target document and a plurality of callback units, each for generating a different type of basic logical object or set of logical objects including at least one basic logical object; a plurality of content architecture conversion components each for converting a different one of the possible data types of the content of the source document to the target format, each being callable from the others and from the units of the structure architecture conversion component, and each capable of calling back to any one of a corresponding set of the callback units; so as to effect conversion of intermixed content types in the source document.

It is possible for content of different types to be intermixed within a compound document. This aspect of the present system provides a system of callbacks to handle this situation. When content of a first type is found to have content of a second type embedded in it, the conversion component for the first type will be unable to convert the content of the second type. It will therefore perform a callback to the profile conversion component. In response, the profile conversion component invokes the content conversion component for the second type of content, and this content conversion component then performs the necessary conversion and, when this conversion is completed, returns to the profile conversion component. The profile conversion component recognizes that callback processing was being performed and therefore returns processing to the first content type's conversion component.

Other objects, features and advantages of the invention will become apparent from a reading of the specification when taken in conjunction with the drawings in which like reference numerals refer to like elements in the several views.

DESCRIPTION OF THE PREFERRED EMBODIMENT

The present conversion system separates the conversion of the content types (architectures) within the compound documents from the conversion of the logical and layout structures within those documents. It is made up of a number of separate conversion components, including a main conversion component, profile conversion components, and content architecture conversion components. The profile conversion components and content conversion components are identified by names corresponding to the profile or content architecture names. The system provides the addition of extra profile conversion components and content conversion components as new profiles and content format conversion components are developed. These additions may be effected without the need for any changes to be made to the other (existing) conversion components of the system.

The main conversion component performs the function of identifying the profile to which the compound document conforms and the selection and invocation of the profile conversion component. (If a compound document specifies a profile and a profile conversion component for that profile does not exist in the system, and error will be reported to the calling system and the conversion will be aborted.) The profile conversion component will then proceed with the processing and conversion of the logical and layout structures within the document being converted. When content is located within a compound document that is being converted, the content architecture to which the content belongs is identified and the corresponding content architecture conversion component is invoked to perform the conversion.

It is possible for content of different types to be intermixed within a compound document. The present system provides a system of callbacks to handle this situation. When content of a first type is found to have content of a second type embedded in it, the conversion component for the first type will be unable to convert the content of the second type. It will therefore perform a callback to the profile conversion component. In response, the profile conversion component invokes the content conversion component for the second type of content, and this content conversion component then performs the necessary conversion and, when this conversion is completed, returns to the profile conversion component. The profile conversion component recognizes that callback processing was being performed and therefore returns processing to the first content type's conversion component.

Figure 3:
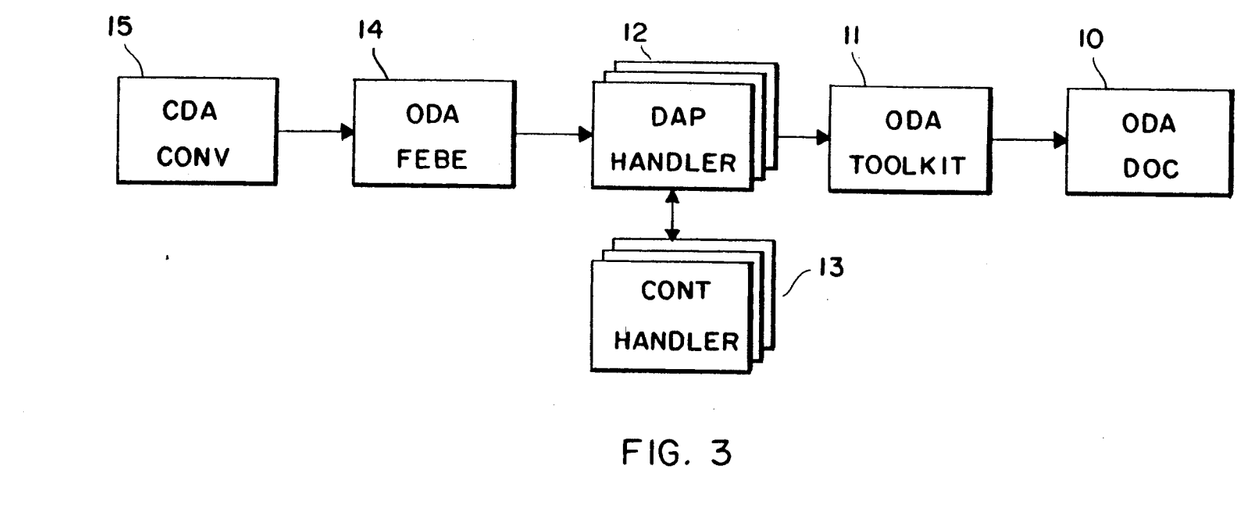
FIG. 3 is a general block diagram of the converter according to the present invention.

FIG. 3 is a block diagram of the conversion system for converting a DDIF document to ODIF form. The DDIF document may be taken as being stored in a CDA converter kernel unit 15, which is coupled to an ODA FEBE (front-end back-end) Main Component 14. A set of structure handlers 12 is coupled to the FEBE unit 14, and a set of contents handlers 13 is coupled to the structure handlers 12. These units 12 and 13 together perform the essential aspects of generating the required ODIF document, which is passed to an ODA toolkit unit 11, which is in turn coupled to an ODA document unit 10.

The principles of operation of the two components 14 and 15 are described in U.S. patent application Ser. No. 07/368,716, filed Jun. 19, 1989, entitled SYSTEM AND METHOD FOR CONVERTING BETWEEN A SOURCE STRUCTURE AND A TARGET STRUCTURE IN A DIGITAL DATA PROCESSING SYSTEM, with inventors, Martin L. Jack, et al., not shown here. It may however be noted that the CDA Converter Kernel 15 has coupled to it a CDA Toolkit unit (analogous to the ODA Toolkit unit 11), a DDIF Document Unit, and possibly a DTIF (Document Table Interchange Format) Document Unit; the details of the DDIF and DTIF units and/or the structure of the data stored in them is described in the two further U.S. applications filed simultaneously, Ser. No. 07/368,697 entitled TABULAR DATA FORMAT, filed on Jun. 19, 1989 by inventors Carol A. Young and Neal F. Jacobson and, Ser. No. 07/368,703 entitled DATA STRUCTURE INCLUDING EXTERNAL REFERENCE ARRANGEMENT, filed on Jun. 19, 1989 by Robert L. Travis et al.

The toolkits operate to analyze the associated documents (identifying the various segments and other features of the documents), to extract from the documents the various components of that document, and to generally manipulate the documents. The documents are generally stored in forms suitable for reasonably efficient storage, and the toolkits broadly provide and interface which presents the organizational and structural aspects of the documents.

The ODA/ODIF standard is, of course, very elaborate, and many of its users do not require the full range of ODA/ODIF facilities. Certain subsets of the full ODA/ODIF standard have therefore been developed; these are known as DAPs (Document Application Profiles). These subsets can be loosely classified into levels. Level 1 is simple text manipulation; level 2 is simple word processing (with page numbering, and a fairly elaborate logical structure); level 3 is complex word processing and desk top publishing (with complex layouts, fonts and printing, diagram, &c); and level 4 is full ODA/ODIF. Three specific DAPs are known as Q111, Q112, and Q121.

There is therefore a plurality of structure handlers 12, which are also termed DAP handlers. An initial determination is made as to which of the DAPs the document is to conform with, and selects the appropriate DAP handler accordingly. This results in greater efficiency if the DAP level is low.

As discussed above, there are various types or metaclasses of contents; such types may, for example, comprise text, raster graphics, and geometric graphics. There is a plurality of contents handlers 13 (also termed contents architecture handlers), one for each type, to perform the conversion of contents of corresponding types.

It will be realized that the system can be expanded by the addition of further DAP Converters as further DAPs are developed in the future, and also by the addition of further Contents Architecture Handlers as the possible contents metaclasses are expanded in the future.

To perform the conversion of the CDA document to a ODA form, its structure (primarily its segmentation) has to be analyzed and the various contents components of it converted, and the appropriate objects generated of the ODA document which is being produced. The selected DAP handler and the Contents Architecture handlers cooperate in analyzing the structure of the CDA document; the various Contents Architecture handlers perform the conversion of the various contents components of the CDA document; and the selected DAP handler generates the objects of the ODA document.

Figure 4:
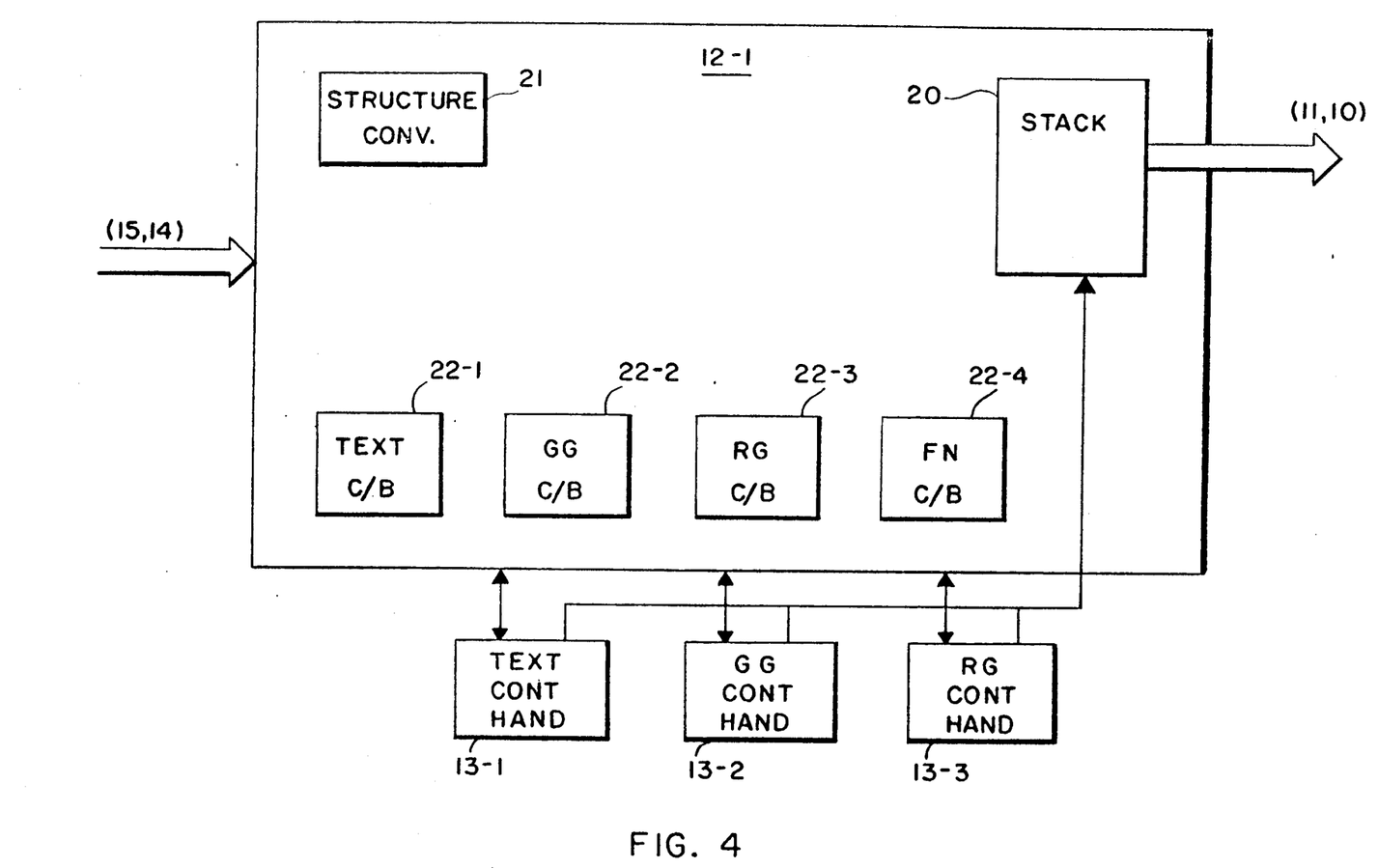
FIG. 4 is a more detailed block diagram of parts of the converter of FIG. 3.

FIG. 4 is a more detailed block diagram of a typical DAP handler and associated Content Architecture handlers. When a document is to be converted, one of the set of DAP handlers is selected. A single DAP handler 12-1 is therefore shown. It is assumed that it is a DAP which permits three types of contents, text TEXT, geometric graphics GG, and raster graphics RG. Three respective Contents Architecture handlers 13-1 to 13-3 are therefore shown.

In the process of converting a CDA document to an ODA document, the various objects and blocks of the ODA document have to be constructed. Each object has a structure including its identification and links with other objects, and its contents block (if any). In the conversion process, it is often necessary to maintain several objects simultaneously in the process of construction. The DAP handler 12 therefore includes an object store 20, in which objects in the process of being constructed can be held. This store is a stack, since in fact once the construction of a new object has begun, no changes need be made to earlier objects still under construction until the construction of the latest object has been completed.

It is convenient for present descriptive purposes to assume that the objects are completely assembled in the store 20. However, it will be realized that their assembly can in fact be completed by the units 14 and 15; these may contain a toolkit, corresponding to the toolkit of unit 11, for that purpose. If an object has contents, those contents will be generated by one of the contents handlers 13.

The DAP handler 13 contains a structure conversion component 21 which analyzes the structure of the incoming CDA document and initiates the generation of the appropriate ODA compound logical objects. It also contains a plurality of call-back processing units TEXT 22-1, GG 22-2, RG 22-3, and FN 22-4, for processing text, geometric graphics, raster graphics, and footnotes respectively. The call-back units are called by the content handlers and create the appropriate logical objects needed to accommodate the changed type of content, passing the objects back down to the appropriate contents handlers for the conversion of the informational contents (text, graphics, etc.).

Some segments in a CDA document contain only content of a single type. The conversion process for such a segment is relatively simple. The structure conversion component 21 identifies the type of the contents and passes the segment to the appropriate content handler 13. The selected content handler 13 converts the content of the segment passed to it. Once the content conversion is complete, the content handler uses the callback mechanism to identify where the content should be stored. If for example the content is text content, the content handler 13-1 calls back to the text callback unit 22-1 in the DAP handler. The text callback unit 22-1 then generates a basic logical object (BLO) of the text type, and stores it to the most recent (compound logical object) CLO on the stack 20. The text callback unit 22-1 then returns this new BLO to the text content handler 13-1, which then stores the converted content to the new BLO.

As noted above, the blocks themselves are assembled in the store 20. However, the blocks are identified by pointers to them from the content handlers, callback units, and stack 20. Thus "generating a BLO and storing it to a CLO" involves creating the BLO and entering, into the CLO, links to the newly created BLO; and "storing content to a BLO" involves locating the BLO and entering the content into it.

The processing of a sequence of elements of the same type in a single segment is similar. What happens here is that as successive elements of the text segment are encountered, so their contents are converted by the text content handler 13-1, and blocks are created by the text callback unit 22-1 to contain the converted text elements.

It is thus evident that in the present system as so far described, the processing of the structure or layout of the document is strictly separated from the processing of its contents. The processing of the structure or layout is performed exclusively by the selected DAP handler, with the various blocks being created by the structure converter and the various callback units. The processing of the contents is performed exclusively by the contents architecture handlers, and the processing of each type of contents is performed exclusively by the content architecture handler for that type. These principles are maintained with the more complicated situations described below.

In the situations discussed so far, there has been an exact correspondence between the two systems (ODA/ODIF and CDA/DDIF). However, there are situations in which this correspondence breaks down, and the conversion system has to cope with these situations. This is achieved by repeated transfers of control between the call-back units and the content handlers. When the end of a particular type of content is reached, the content handler unit returns control to the unit which called it. If there is more of the original type of contents, the contents handler then continues the conversion process, with more clocks being created by the callback. If not, the contents handler returns control back to the content handler which called it or, if it was not called by a content handler, to the structure conversion component 21.

To take a specific example, in CDA/DDIF a text segment can include geometric graphics and/or raster (image) graphics contents. (A geometric graphics segment can similarly contain image contents.) An ODA/ODIF BLO (basic logical object (or basic layout object)) can however contain only a single type of content.

When the DAP handler 12 encounters a text segment, it passes the text content to the text content handler 13-1, which starts to read the content. A successive text elements of the segment are encountered, they are converted by the text handler 13-1. To store this converted content, the text content handler 13-1 calls the text callback 22-1 to request a BLO in which the converted content can be stored. The callback unit 22-1 creates a BLO and stores it to the most recent CLO on the stack 20, and then passes the new BLO back to the text content handler 13-1. The text content handler 13-1 then stores the converted text content to the new BLO.

When the text content handler encounters a geometric graphics segment stored within the text segment, the text contents handler cannot deal with it. The text contents handler stores any text already converted by requesting a BLO from callback unit 22-1 and storing the content to it, and then calls the GG content handler 13-2 and passes the geometric graphics segment to it. The GG content handler 13-2 then starts to convert the geometric graphics content. When the GG content handler 13-2 has completed conversion of the content, it uses the callback mechanism to call back to (pass control to) the GG callback unit 22-2. The callback unit 22-2 creates a BLO for geometric graphics content and stores it to the most recent CLO on the stack 20, and passes the new BLO to the GG content handler 13-2, which then stores the converted content to the new BLO. As the GG content handler 13-2 has now completed the content conversion of the geometrical graphics segment, it then returns control to the text content handler 13-1 which originally called it. The text content handler 13-1 then resumes process of the remaining text content in the text segment.

Figure 5:
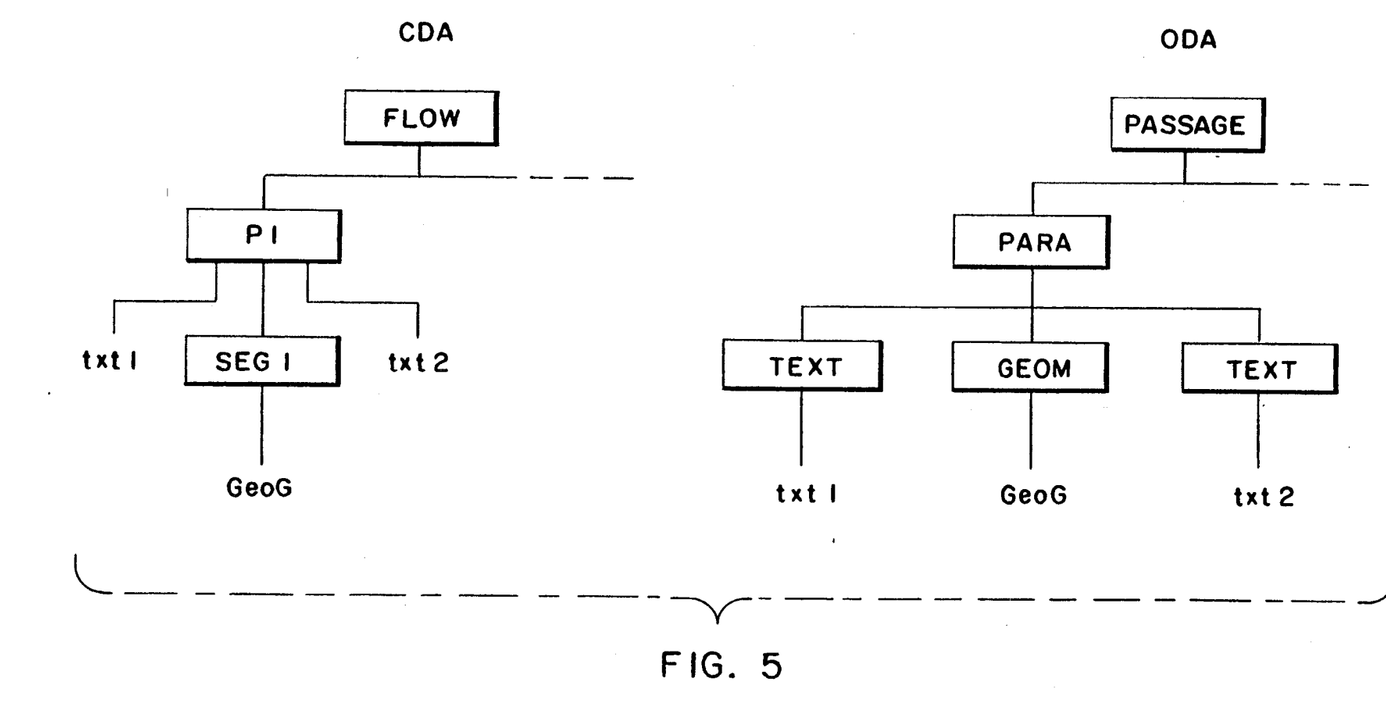
FIGS. 5 and 6 are block diagrams illustrating the conversion of parts of two ODA documents to corresponding CDA documents by the converter of FIGS. 3 and 4.

This process is illustrated by FIG. 5. The left-hand part of this figure show a portion of a CDA document, consisting of a flow segment FLOW containing a paragraph segment P1 which in turn contains a text contents portion txt1, a nested segment containing a geometric graphics content portion GeoG, and a further text contents portion txt2. The corresponding ODA document is shown on the right, consisting of a passage CLO (compound logical object) PASSAGE containing a paragraph CLO PARA which in turn contains three BLOs TEXT, GEOM, and TEXT, containing the text contents portion txt1, the geometric graphics content portion GeoG, and the text contents portion txt2 respectively. (It is convenient to use the same terms for the contents portions in both CDA and ODA formats.)

The PASSAGE and PARA CLOs in the figure are structure elements which are created by the structure conversion component for the DAP handler. The TEXT and GEOM BLOs in the figure are created by the text callback unit 22-1 and the GG callback unit 22-2 at the request of the text content handler and the GG content handler respectively. The various contents—txt1, GeoG, and txt2—are stored to the BLOs by the Content Handlers. This process is described more fully in the following paragraphs.

In the conversion process, the CDA document is initially processed by the structure conversion component 21. This first encounters the segment FLOW, and creates the corresponding object PASSAGE. Since the PASSAGE object will have a substructure, it is a CLO, and it is therefore entered in the stack 20 to await the creation of the dependent objects. The structure conversion component 21 next encounters the segment P1, and creates the corresponding object PARA, which is also a CLO and entered in the stack 20.

The structure conversion component 21 next encounters the first content element of the segment Pl, and finds that it is of text type. It therefore calls the text contents handler 13-1 and passes the segment to it. The text content handler identifies the first content element, txt1, and converts it. It then identifies the next content element of the segment as being a segment, SEG1, with geometric graphic content. The text content handler 13-1 therefore has to relinquish control.

Before doing so, it calls the text callback unit 22-1, which creates a text type BLO (TEXT) and stores it to the most recent CLO (the PARA) on the stack 20. The text callback unit 22-1 then returns the newly created BLO to the text content handler 13-1. The text content handler 13-1 then stores the converted text, txt1, to the new BLO. Then the text content handler 13-1 calls the GG content handler 13-2 and passes SEG1 to that content handler.

The GG content handler 13-2 now has control, and starts reading the content of SEG1. It identifies the content GeoG and converts it. When it reaches the end of the content of SEG1, the GG content handler calls the GG callback unit 22-2. The GG callback unit 22-2 creates a geometric type BLO (GEOM) and stores it to the most recent CLO (PARA) on the stack 20. The GG callback unit 22-2 then returns the new BLO to the GG content handler 13-2. The GG content handler 13-2 then stores the converted content GeoG to the new BLO. Finally, it returns control to the component which called it—the text content handler 13-1.

The text content handler has now regained control, and proceeds to continue reading the content of P1. As a result, it finds the next element, txt2, and identities it as being a further text element. The text content handler 13-1 converts txt2 and then calls the text callback unit 22-1 as before. The text callback unit 22-1 creates another text type BLO (TEXT) and stores it to the PARA CLO on the stack 20. It then returns the new BLO to the text content handler 13-1, which stores the converted content txt2 to the new BLO.

The text content handler 22-1 then recognizes that it has reached the end of the content of Pl, so it returns to the structure conversion component 21 which originally called it. The structure conversion component 21 then recognizes that it has completed the processing of the Pl segments, so it removes the PARA CLO from the stack and stores it to the next (now most recent) CLO (the FLOW) on the stack 20, and continues to the next segment stored under FLOW.

Obviously if the segment Pl had contained only txt1 and SEG1 with GeoG, then the text content handler 13-1 would have returned to the structure conversion component 21 immediately after the GG content handler 13-2 had completed processing (with the GEOM BLO being completed) and returned to the text content handler 13-1.

The operation of the raster graphics (RG) call-back unit 22-2 is similar. If any other component—the structure conversion component, the text content handler or the GG content handler—identified a segment with raster graphics, then the RG contents handler is called and the segment with raster content is passed to it. The RG content handler 13-3 converts the content and calls the RG callback unit 22-3, which creates a raster type BLO and stores it to the ODA document. The RG callback unit 22-3 returns the new BLO to the RG content handler 13-3, which stores the converted content to the new BLO and then returns to the component which called it.

The operation of the footnote call-back unit 22-4 is somewhat more complicated. A footnote is actually a structure occurring within text content, so a callback is provided to allow the DAP handler the control of the structure processing.

Figure 6:
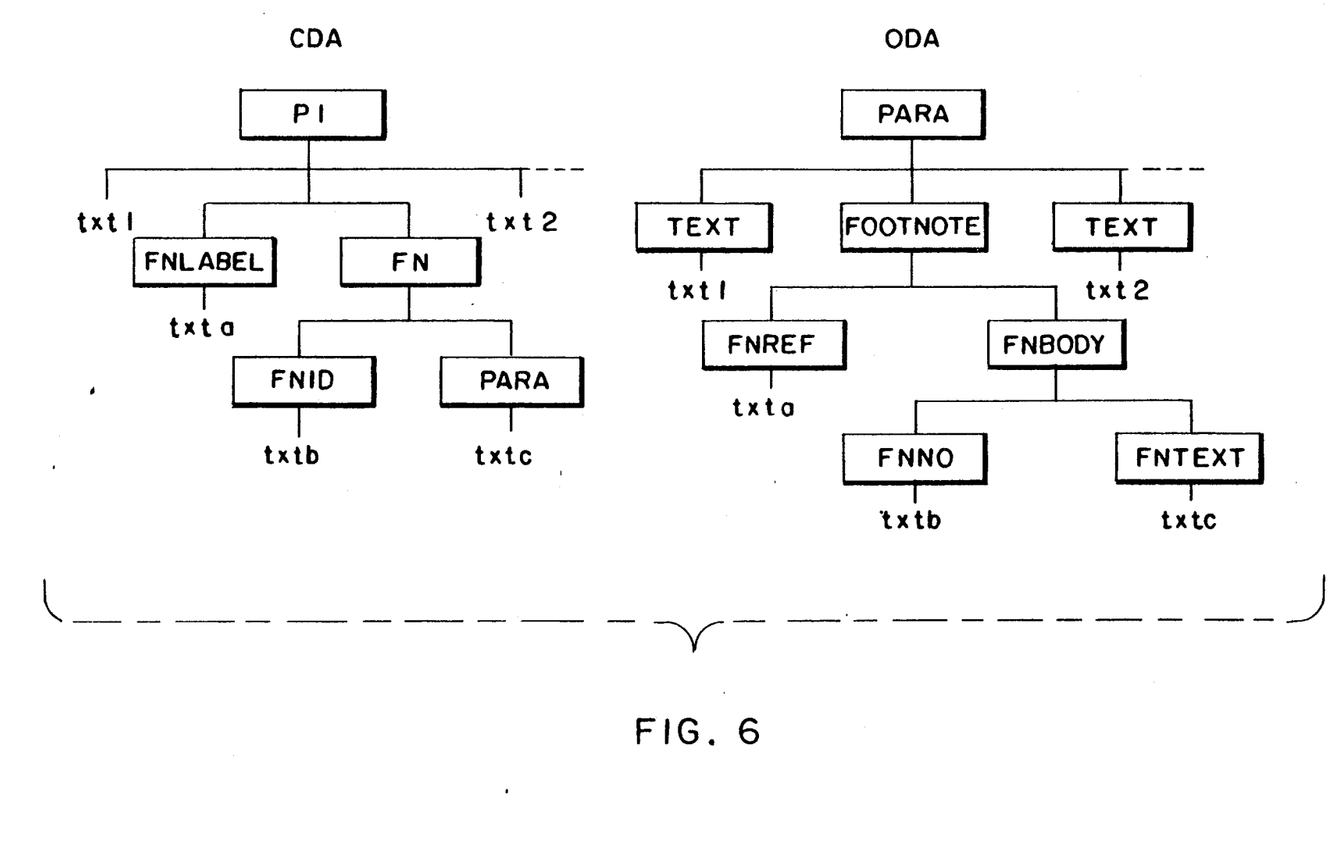

FIG. 6 illustrates how footnotes are handled. A footnote consists of a footnote text txta which is the actual footnote body, a footnote reference text txtb which appears in the body of the main text, and a footnote identifier text txtc which is the corresponding reference which appears against the footnote body. The footnote will generally be included between two successive portions of text txt1 and txt2. It will be realized that the text contents portions txta (which appears in the main body of the text, between the text portions txt1 and txt2) and txtb are identical. Further, these contents portions are computed contents rather than explicit contents; in other words, the values of these text portions will be computed by the system, rather like page numbers, rather than the actual values being entered explicitly.

In a CDA document, the footnote structure itself consists of a footnote reference segment FNLABEL with the footnote reference text txta, and a footnote segment FN with a footnote identifier subsegment FNID with text txtb and a footnote text subsegment PARA with the footnote text txtc. In the corresponding ODA document, the footnote appears as an object ree of a CLO FOOTNOTE with a BLO FNRF with text txta attached and a further CLO FNBODY which in turn has two BLOs, FNNO with footnote identifier text txtb attached and FNTEXT with footnote body text txtc attached.

When the text contents handler 13-1 encounters the footnote, i.e. The FNLABLE plus FN combination, it calls the footnote call-back unit 22-4 and passes the footnote to it. The callback unit 22-4 then creates a FOOTNOTE CLO and stores it on the stack 20. The unit 22-4 then creates an FNREF BLO and stores it to the FOOTNOTE CLO. Since the content of the footnote reference is computed content, the appropriate attributes for computing the content are defined on the FNREF BLO. Because the text contents portion txta is computed contents, it does not need to be converted.

The callback unit 22-4 next creates the footnote body CLO FNBODY, and stores it to the stack 20. It next creates the footnote number BLO FNNO, and stores it to the FNBODY CLO; the text contents portion txtb does not need to be converted as it is computed contents like txta.

The footnote call-back unit 22-4 then identifies the content of the PARA segment as being text, and therefore calls the text content handler 13-1 to convert eh content. This call is recursive; that is it is a new call to the text content handler, form which the return will be to the footnote callback unit. It is not a return to the text content handler to the footnote callback unit.

The text content handler then processes the content of the PARA segment by its normal operation, and the content txtc is converted. The text content handler then calls the text callback unit 22-1, which generates a BLO FNTEXT and stores it to the CLO FNBODY on the stack 20. The BLO FNTEXT is then returned by the text callback unit to the text content handler 13-1, which stores the converted txtc to the new BLO, and returns control to the footnote callback unit 22-4 (thus ending the recursive call to the text content handler).

At this point the footnote processing is complete, so the footnote callback unit 22-4 removes the CLO FNBODY from the stack 20 and store it to the CLO FOOTNOTE on the stack 20, which has just been uncovered by the removal of the CLO FNBODY. Then the footnote callback unit removes the FOOTNOTE CLO from the stack 20 and stores it to the previous CLO (a PARA) on the stack 20. Finally the footnote callback unit returns control to the text content handler, which then continues to process txt2 in the usual way.

Considering more generally the relationships between the contents handlers and the callback units, these are determined by the DAP handler. Each content handler is provided with a particular permitted set of callbacks by the DAP handler, and when a content handler is required to call another content handler, it will in turn pass on the same set of callbacks which it received form the DAP handler. But each content handler can only call its own type of callback units - thus the text contents handler 13-1 can only call the text and footnote callback units 22-1 and 22-4, the geometric graphics content handler 13-2 can only call the geometric graphics callback unit 22-2, etc.

However, the permitted set of callbacks may be changed under different circumstances, as is appropriate to the current position in the document. For example, the type of text BLO required when creating a document header may be different form the type required when creating the body of a document. The text callback unit 22-1 will thus have two slightly different functionalities depending on what part of the document is involved. The DAP handler (either the structure conversion component or a footnote callback unit - which is a component of the DAP handler like the structure conversion component) knows which set of callbacks is appropriate and passes them to the content handlers.

A footnote is also generally text. However, the functionalities required for a callback in the event of a footnote being encountered involve the generation of the various CLOs and BLOs shown and discussed with reference to FIG. 6. These functionalities are so different from those required in the generation of ordinary textual segments that it is convenient to regard the footnote callback as being performed by a footnote callback unit, 22-4, which is distinct form the ordinary text callback unit 22-1.

As noted above, the processing of a footnote involves a recursive call to the text handler 13-1. In principle, recursion can occur quite generally. For example, if geometric graphics information is encountered within text, text can be encountered within the geometric graphics (e.g. as labels or legends). This will again involve recursion, with a return from the text inside the graphics back to the graphics ending the recursion.

In practice, however, the kinds and depth of recursion are likely to limited. Further, the DAP handler may impose restrictions on the kinds of depth of recursion which are allowed. For example, the DAP handler may not allow graphics to occur within footnotes. One way in which the DAP handler can achieve this is by limiting the extent to which the contents handlers can call each other. Thus the text contents handler 13-1 can call either of the graphics handlers 13-2 and 13-3, but the raster graphics handler 13-3 cannot call the text handler 13-1, because in CDA, text content will not occur within raster graphics image content.

It was noted above that there are different DAP handlers for the different DAPs. Such different DAP handlers may have different sets of contents handlers associated with them. Different DAPs may similarly have different sets of call-back units, and different constraints and/or constraint mechanisms on them, in their corresponding DAP handlers.

The above discussion has been in terms of the conversion of the logical objects, i.e. of the informational contents of the documents. The conversion of the layout information follows the same principles.

We claim:

1. A data structure format conversion system comprising:
   a plurality of profile conversion components for converting the logical and/or layout structures of the source document to those of the target format;
   a plurality of content architecture conversion components selected by the profile conversion components for converting the contents of the source document to the target format and being invoked by the required content architecture conversion component; and
   a main converter component for identifying the profile to which the compound document conforms and invoking the required profile conversion component.

2. A system according to claim 1 wherein the content architecture conversion components include a text conversion component, a geometrical graphics conversion component, and a raster graphics (bit image) conversion component.

3. A system according to claim wherein the profile conversion components include components implementing ODA Q111, Q112, and Q121 standards.

4. A system according to claim 1 wherein each profile conversion component comprises means for generating logical objects of the target document architecture, comprising a structure converter unit for generating compound logical objects of the target document and a plurality of callback units, each for generating a different type of basic logical object or set of logical objects including at least one basic logical object; and each content architecture conversion component converts a different one of the possible data types of the content of the source document to the target format, each being callable from the others and from the units of the structure architecture conversion component, and each capable of calling back to any one of a corresponding set of the callback units.

5. A system according to claim 2 wherein each profile conversion component comprises means for generating logical objects of the target document architecture, comprising a structure converter unit for generating compound logical objects of the target document and a plurality of callback units, each for generating a different type of basic logical object or set of logical objects including at least one basic logical object; and each content architecture conversion component converts a different one of the possible data types of the content of the source document to the target format, each being callable from the others and from the units of the structure architecture conversion component, and each capable of calling back to any one of a corresponding set of the callback units.

6. A system according to claim 3 wherein the callback units include a text callback unit, a graphics callback unit, and a footnote callback unit.

7. A data structure format conversion system comprising;
   a structure architecture conversion component for generating logical objects of the target document architecture, comprising a structure converter unit for generating compound logical objects of the target document and a plurality of callback units, each for generating a different type of basic logical object or set of logical objects including at least one basic logical object;
   a plurality of content architecture conversion components each for converting a different one of the possible data types of the content of the source document to the target format, each being callable from the others and from the units of the structure architecture conversion component, and each capable of calling back to any one of a corresponding set of the callback units.

8. A system according to claim 7 wherein the content architecture conversion components include a text conversion component, a geometrical graphics conversion component, and a raster graphics (bit image) conversion component.

9. A system according to claim 7 wherein the callback units include a text callback unit, a graphics callback unit, and a footnote callback unit.

10. A system according to claim 8 wherein the callback units include a text callback unit, a graphics callback unit, and a footnote callback unit.

11. A system according to claim 7 wherein there is a plurality of structure architecture conversion components, any one of which is selectable.

12. A system according to claim 8 wherein there is a plurality of structure architecture conversion components, any one of which is selectable.

13. A system according to claim 10 wherein there is a plurality of structure architecture conversion components, any one of which is selectable.

14. A system according to claim 7 wherein the structure architecture conversion components include components implementing ODA Q111, Q112, and Q121 standards.

* * * * *